United States Patent [19]

Werth et al.

[11] 4,369,442

[45] * Jan. 18, 1983

[54] CODE CONTROLLED MICROCONTROLLER READOUT FROM COIN OPERATED MACHINE

[75] Inventors: Robert L. Werth, 2053 W. Romney Dr., Anaheim, Calif. 92801; Timothy L. Brehm, Irvine, Calif.

[73] Assignee: Robert L. Werth, Anaheim, Calif.

[ * ] Notice: The portion of the term of this patent subsequent to Aug. 5, 1997, has been disclaimed.

[21] Appl. No.: 175,294

[22] Filed: Aug. 4, 1980

Related U.S. Application Data

[63] Continuation-in-part of Ser. No. 830,758, Sep. 6, 1977, Pat. No. 4,216,461.

[51] Int. Cl.[3] .......................... H04Q 9/00; G06F 7/00; G06F 9/06

[52] U.S. Cl. .......................... 340/825.35; 235/92 AC; 235/92 CN; 364/479; 194/1 N

[58] Field of Search .................... 340/149 R, 162, 150, 340/825.35; 364/479, 900; 235/92 AC, 92 CN; 194/1 N

[56] References Cited

U.S. PATENT DOCUMENTS

| | | | |
|---|---|---|---|
| 4,216,461 | 8/1980 | Werth et al. | 340/149 R |
| 4,231,105 | 10/1980 | Schuller | 235/92 AC |
| 4,272,757 | 6/1981 | McLaughlin et al. | 340/825.35 |

*Primary Examiner*—Donald J. Yosko

*Attorney, Agent, or Firm*—Willie Krawitz

[57] ABSTRACT

A system for monitoring, testing, auditing and controlling vending machines is disclosed.

The system includes a counter attached to the vending machine, and a microprocessor controlled, portable, keyboard operated, collection unit adapted to serve a number of vending machines by accessing and interrogation of the counter. The portable collection unit also is adapted to load a program into the counter, input instructions, data and code changes to the counter and, upon interrogation of the counter, receives various types of output information from the counter.

The counter performs functions which include: coin transactions, code validations, inventory control, product and price changes, service and transaction time checks, dispensing, machine diagnostics, temperature control, etc.

21 Claims, 6 Drawing Figures

CODE CONTROLLED MICROCONTROLLER READOUT FROM COIN OPERATED MACHINE

This application is a continuation-in-part of U.S. Ser. No. 830,758 filed Sept. 6, 1977, and now U.S. Pat. No. 4,216,461 issued Aug. 5, 1980.

BACKGROUND OF THE INVENTION

The parent application concerns a vending machine whose operations are monitored by a counter sensor comprising a single chip battery powered microelectronic circuit which detects coin transactions such as net coin intake, storage of coin totals, etc. The sensor is also adapted to contain information on code data, code changes, servicing requirements, prior service history, power outages, battery deterioration and tamper attempts. In addition, times and dates of coin collection, coin useage, power interruptions, tampering and servicing are also sensed by the counter, and this information is then stored.

The sensed and stored signals are adapted to be read out from registers by a detachable, portable collection unit (PCU) which can service a large number of vending machines; the PCU is a microprocessor (e.g. a chip) having a keyboard control. The PCU accesses and interrogates, by means of the keyboard input, an individual counter sensor and, using a validation code, obtains the information contained in the memory of the counter. The PCU is also adapted to input data, codes and code changes into the sensor and also perform arithmetic functions such as totalling the coin count to arrive at the amount of money taken in by the vending machine. Inasmuch as the PCU is portable, it can service a large number of vending machines and read out the data stored therein, either directly, or upon receipt of a proper code. Since the PCU has its own built in accessing, interrogation, calculating and display function, it can dispense with the necessity of employing telephone lines or cables connected to say a central processor unit.

The invention described in Applicants' parent application represents a very significant improvement over a CPU system since vending machines are widely dispersed, and can be moved, change ownership, etc. Also, after a period of time, if the validation codes become compromised, they too can be easily changed.

The above function of the device described in our parent application is quite adequate for numerous commercial applications. However, there are many instances where an expanded function of the sensor and PCU would be highly desirable, particularly if, at the outset, the system was incorporated into a vending machine as part of an original equipment manufacture. Thus, for example, it would be desirable to produce an entire program for a particular type or make of vending machine, load the program into the portable collection unit and then into the counter sensor. The program can be produced in the PCU or from a third program and then loaded into the PCU.

It would also be desirable to perform diagnostic operations on a vending machine by an external program rather than by the usual technique of physically testing the operating components of the vending operation one at a time. Thus, a diagnostic program for a malfunctioning item dispenser might include: coin actuation, cup drop, ice drop, item dispensing, water add and water termination. If any step in the sequence does not function, the problem area can be pinpointed immediately.

Normally, the usual diagnostic test routine involves inserting a coin and pressing a particular dispensing button, but this process is time consuming, and obviously it is quicker to simply by-pass the dispensing button and repetitiously test the system. Furthermore, if the item is not dispensed at all, it may indicate the failure of more than one step.

Other types of desired functions include price changing, product changing and inventory control. These functions can be performed manually, but it is much faster to change prices and products and count the inventory by sensors rather than manually; also, inventory recording takes time. Frequently, it is desirable to permit access to the coins only to a select few persons, e.g. a specific collector, etc., rather than permitting all persons who service the machines to have access to the money. A particular code would provide such a security arrangement while still permitting the holder of the PCU to carry out a specific task.

In cases where an item is maintained at a given temperature (e.g. soft drinks, coffee, ice, etc.), it is not necessary for the heating or cooling unit to operate at full capacity for 24 hours a day. Hence, during the day and evening, when traffic is usually at a peak, these heating and cooling units can be maintained at maximum power, whereas say, in the early morning hours, it would be preferred to reduce this power considerably since it involves low peak usage.

THE INVENTION

According to the invention, a tamper resistant system for coin counting and totalling net intake of vending machines is provided, comprising: a sensor and counter employing a microelectronic circuit chip having a plurality of memory registers. The counter is attached or incorporated with the vending machine and is adapted to sense and count net coin intake (after coin changing) and store the net count in a plurality of memory registers in the microelectronic circuits. Additional operations of the sensor and counter include an access code which is unique to the machine (and hence the owner), other code data, code changes, battery deterioration and tamper attempts. In addition, times and dates of: coin collecting, coin usage, power interruptions, tampering and servicing are also sensed by the counter, and this information is also stored. Additional operations upon input of a proper code include: diagnostic testing, price and product changing, inventory control, access control, security alarm, temperature control and program changes. These operations not merely relate to sensing and data storing, but concern control of the vending machine itself.

A PCU incorporating a microprocessor is provided having an input keyboard to access and interrogate the memories upon input of a valid access code. The output from the memories of the coin counter is added in the PCU to obtain a money value which may be read out from the PCU a display such as an LED, LCD, incandescent, etc., or onto a printer, casette, punched card, teletype, etc.; the other related operations are similarly read out. The PCU also may be adapted to store the read-outs and display them only upon receipt of a second access code. This permits the owner, lessee, etc., to enjoy total secrecy from the person (akin to the meter reader) who actually obtains the information from the coin counter. This arrangement ensures a double check on the secrecy of the contents in the coin counter, if desired, since a first access code is required to read out the information from the coin counter and a second access code is needed to read out the information from the PCU. The coin counter should contain the fewest number of operating functions on a cost basis, and hence, a register for validating the codes is contained preferably within the PCU. Through a proper program change or code input from the PCU, the aforementioned counter and sensor functions can monitor and control operation of the vending machine.

BRIEF DESCRIPTION OF THE DRAWINGS

FIG. 2 shows a block diagram of the PCU; and.

DESCRIPTION OF THE PREFERRED EMBODIMENTS

Figure 1:
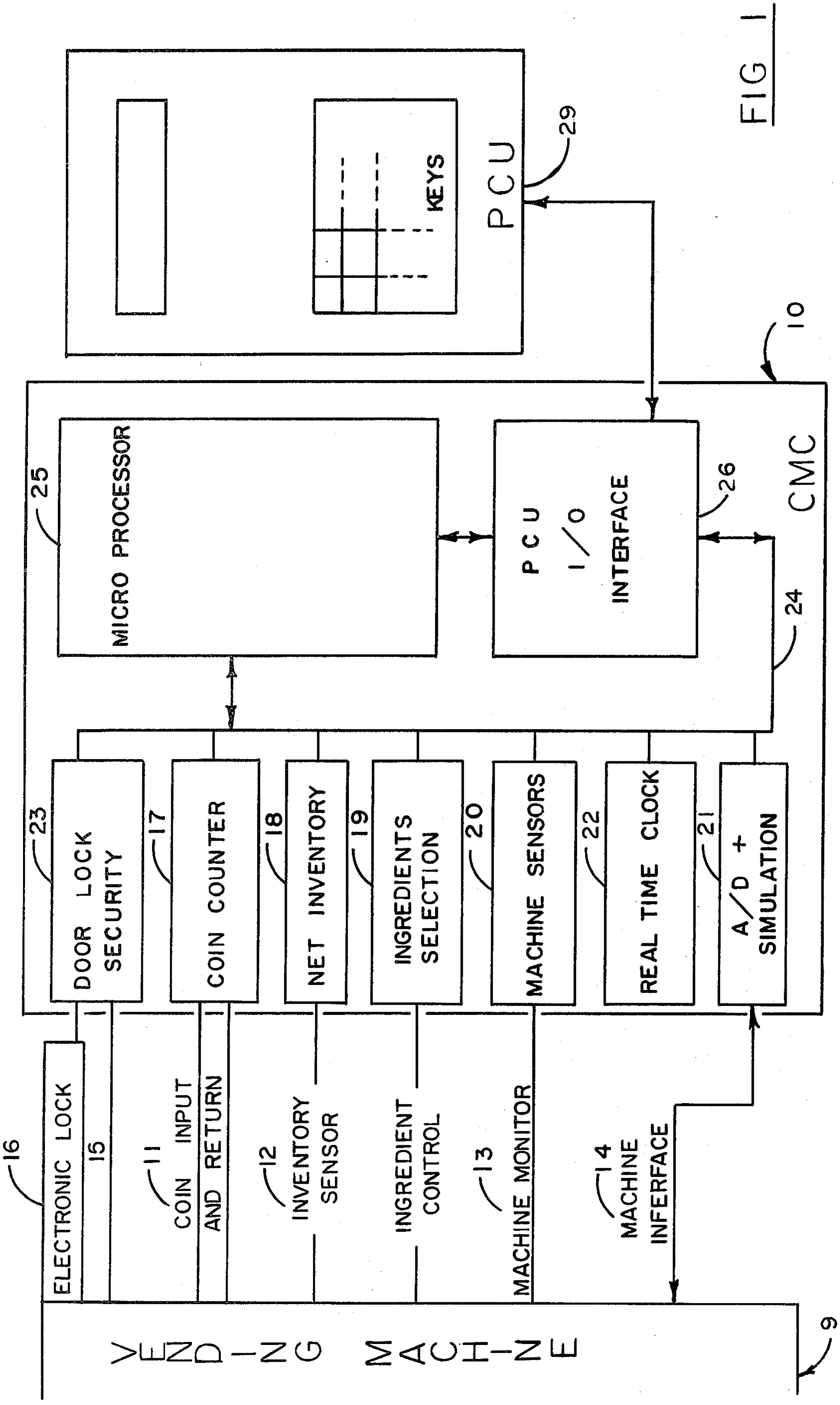
FIG. 1 is a block diagram showing the system view of the counter, PCU, microprocessor and I/O of this invention.

The overall system is shown in FIG. 1, and includes a vending machine 9 and a counter-monitor-controller (CMC) 10. In the counter mode, the CMC functions to provide the net output of coin transactions, inventory control, etc. In the monitor mode, the CMC provides a sensing of temperatue, pressure and levels of liquid and product, as well as tampering, power interruptions, and service and time checks for the above functions. In the control mode, the CMC validates code and code changes, provides diagnostic routines, varies product temperature, sounds a tampering alarm and implements program changes, e.g. prices and inventory changes, game and game format changes, and changes the amount or mixtures of ingredients dispensed, etc.

The CMC 10 includes the usual coin sensing input 11, an inventory input 12, temperature, pressure and product level inputs 13, and a vending machine control input 14. A security circuit input 15 is employed to indicate power failures, and monitors and sounds tampering alarms; an electronic lock 16 opens (via a solenoid) the coin box or permits servicemen to enter the machine and carry out diagnostic routines.

The net coin intake from input 11 is obtained by subtracting coin output from coin input in a register 17. Similarly, net inventory from the inventory input 12 (e.g. packaged items) is calculated in a subtraction register 18 based on inventory originally supplied minus inventory on hand. An ingredient control 19 for liquids and solids (e.g. soup, coffee, milk, ice) is provided to change the amount or mixtures of liquids and solids supplied by the vending machine; the usual warning lights may be employed to signal if an ingredient fill is necessary.

An analogue-to-digital circuit 20 for sensed temperature, pressure and fluid levels from input 13 is provided for readout from the CMC. A machine control simulation 21 is employed to test the device in case of a malfunction and this enables a serviceman to by-pass the coin insertion mechanism and quickly ascertain what particular portion of the vending machine is malfunctioning. For example, cup drops, ice drops, liquid or solid addition, etc. can be made repeatedly and quickly without necessitating a series of separate coin inputs for each test operation. When multiplied over a series of items, it will be appreciated that this mode of testing can save considerable time.

A real time clock 22 is used to provide times and dates of the various transactions which are synchronized for read-out at convenient intervals, e.g. every 1–10 minutes. This enables transaction activities to be monitored with a reasonable degree of accuracy in terms of time. The door lock and security sense memory registers 23 store the owner and access codes for the CMC. Access to the system may be provided one group of individuals such as servicemen, coin collectors, etc., while access to the output registers may be only available to the owner. Validation of an input code may be ascertained simply by subtraction of the input code from the owner or access code; if the result is zero, the input code is obviously valid. The electronic lock is then opened by employing the solenoid 16 that is activated when the input code goes valid. In conjunction with the real time clock 22, register 23 stores service times of the vending machine, power outage times, battery tampering or deterioration and lock break-in attempts.

Signals from the various sensing operations 11–13 and 15 are converted to digit pulses and stored in their corresponding microelectronic circuit registers. Registers 17–21 and 23 may be for example, a CMOS, PMOS or NMOS chip powered by an A.C. source or a D.C. battery; this enables information to be stored by the chip until it is released when accessed or interrogated by the PCU. The registers are connected through a bus 24 to a microprocessor 25 and I/O interface 26. The portable collection unit (PCU) accesses or interrogates the system and inputs data and instructions to the system through the I/O interface 26 by means of its keyboard 29.

A typical microprocessor is the 8048 CMOS chip supplied by Intercil and includes RAM and ROM memories. The RAM stores functions such as programs, counter values, inventory, times and dates of servicing, vending machine values, codes and code changes, performs calculating operations and other items of a variable nature. The ROM performs start-up functions, (e.g. initialization) and calculates functions which arise frequently in an application program. In the arrangement shown, the PCU is detachably connected to the I/O 26 either by a plug-in or by an optical coupling. If the latter is employed, this also permits entry of a bar code into the registers. Signals from the I/O 26 are routed to the system usually through the microprocessor 25. However, if a diagnostic routine is desired to check the microprocessor, it may be by-passed by routing signals directly from the I/O to the bus 24. Vending machine results can then be compared with transmitting or receiving PCU signals through the microprocessor itself.

By means of its keyboard, the PCU inputs information to the counter and accesses information therefrom; the PCU calculates the coin count value and displays this value and the other information on an LED, printer, etc., upon input of a suitable access code. The PCU is employed for servicing a number of vending machines; this enables the pinpointing of responsibility for collection deficiencies, determining location and machine effectiveness, peak load times, and so forth. The information so obtained can be maintained secret within the PCU itself and can be accessed only upon input of the correct code. In addition, the PCU may be employed to receive a program from a central processor unit (CPU) and download the program into the microprocessor 25. If desired, the program can be modified by the PCU prior to use or downloading. In an alternative embodiment, a program can be generated within the PCU and used there solely or it too can be downloaded into the microprocessor 25. Finally, a program stored in the microprocessor can be modified by the PCU, such as code, price and item changes, etc.

Figure 2:
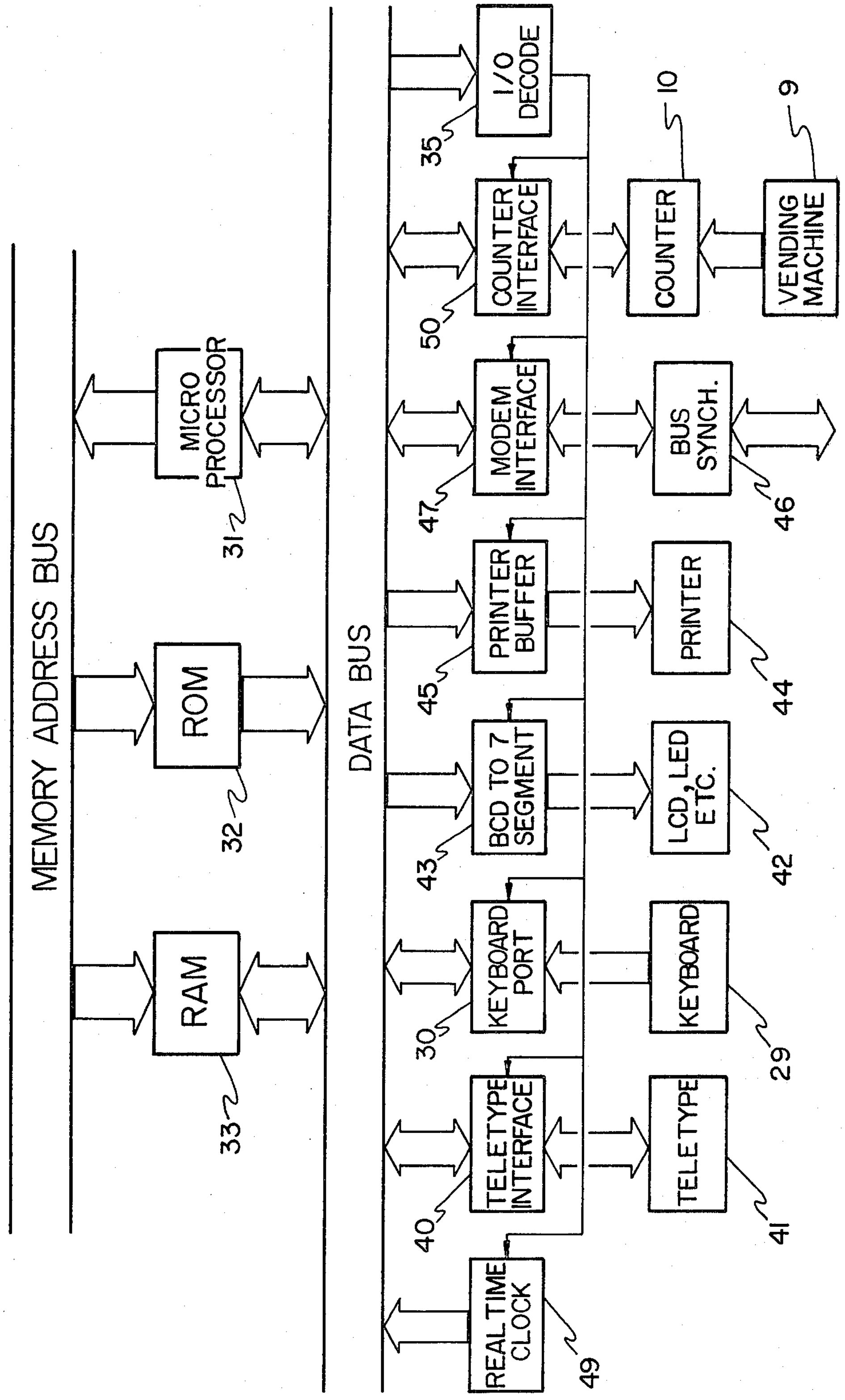

FIG. 2 shows the architecture of the PCU and keyboard 29 for supplying data acquisition requests, and codes such as access and change codes to the system. Specific data acquisition requests include obtaining coin totals from the counter and determining their money values, dates and times of use and servicing, etc., inventory requirements and so forth.

Inputs from the keyboard 29 are fed to a digit converter 30 for converting keyboard contacts to digit pulses. These pulses are fed to a data bus and then to a microporcessor 31 where they are converted to a command. If the command is an add, the microprocessor will access information from a RAM 33 and a ROM 34 to enable the instruction to be carried out. If the instruction is a code validation, the operation may be carried out in a comparison register using, say, a subtraction process. If the subtraction yields a number not equal to zero, the machine number and access code, which has been entered through the keyboard, are obviously not the same and the program will permit no information to be transmitted or received at any I/O port. Preferably, however, a code validation is carried in the microprocessor 25. If the instruction is a print or read out, data from the microprocessor will be decoded in an I/O decode 35 and sent to a teletype interface 40 for conversion to pulses in, say, a control character register to activate the appropriate numbers and characters for print out by a teletype 41. Similarly, other print out instructions may be sent to an LED, LCD 42, etc. via a BCD-to-number decode 43, or to a printer 44 via a printer interface 45. A bus synchronizing clock 46 operating via a modem 47, synchronizing movement of pulses through the system and with the read out, if any. The bus system is the UNIBUS variety, but other types may be used. A real time clock 49 may be used to afford a date and time read out along with the other data. A counter interface 50 is employed to input instructions to the counter 10 from the microprocessor 31 through the I/O decode 35.

Figure 3:
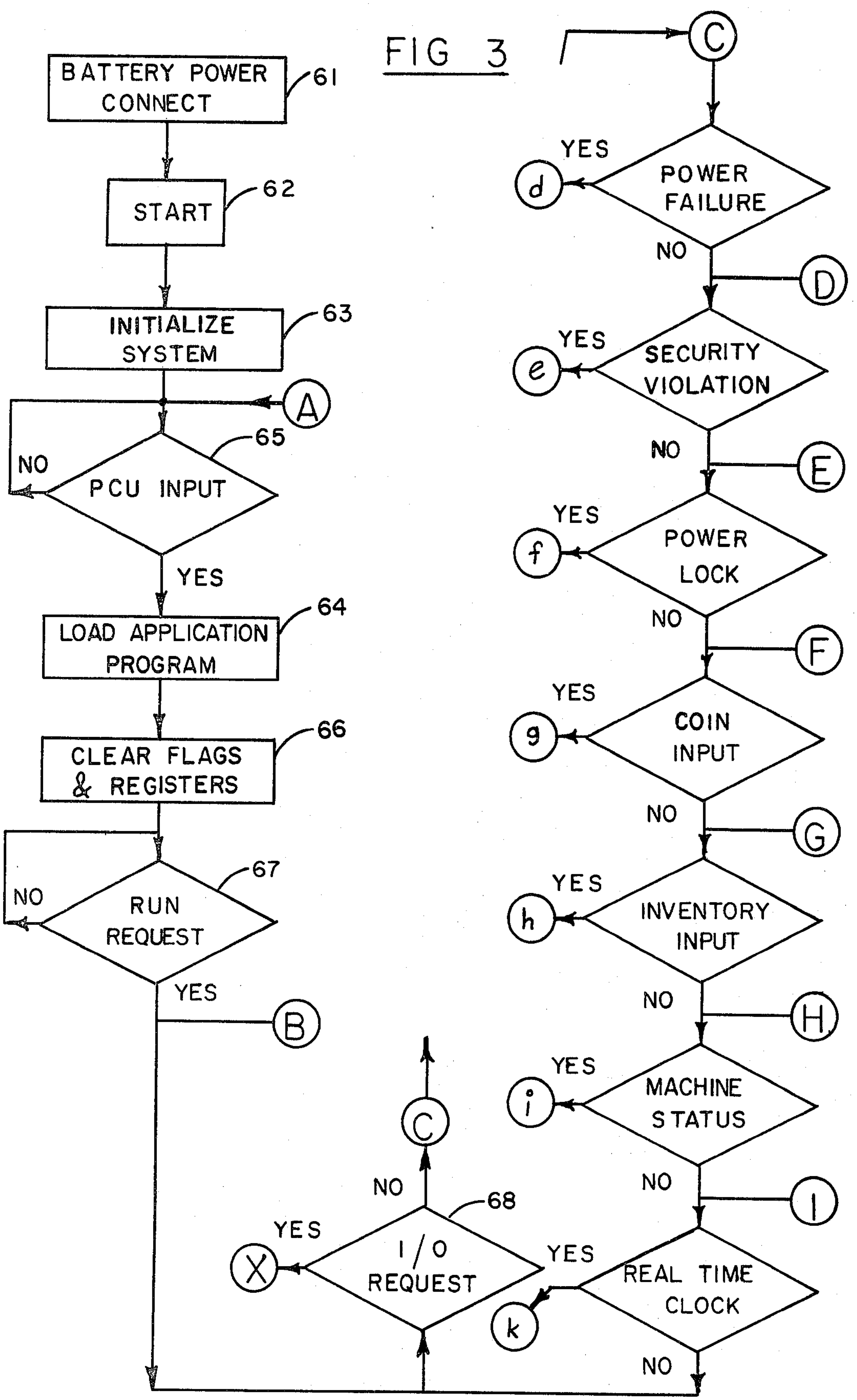
FIGS. 3–6 show program flow charts for operation of the system.
Figure 4:
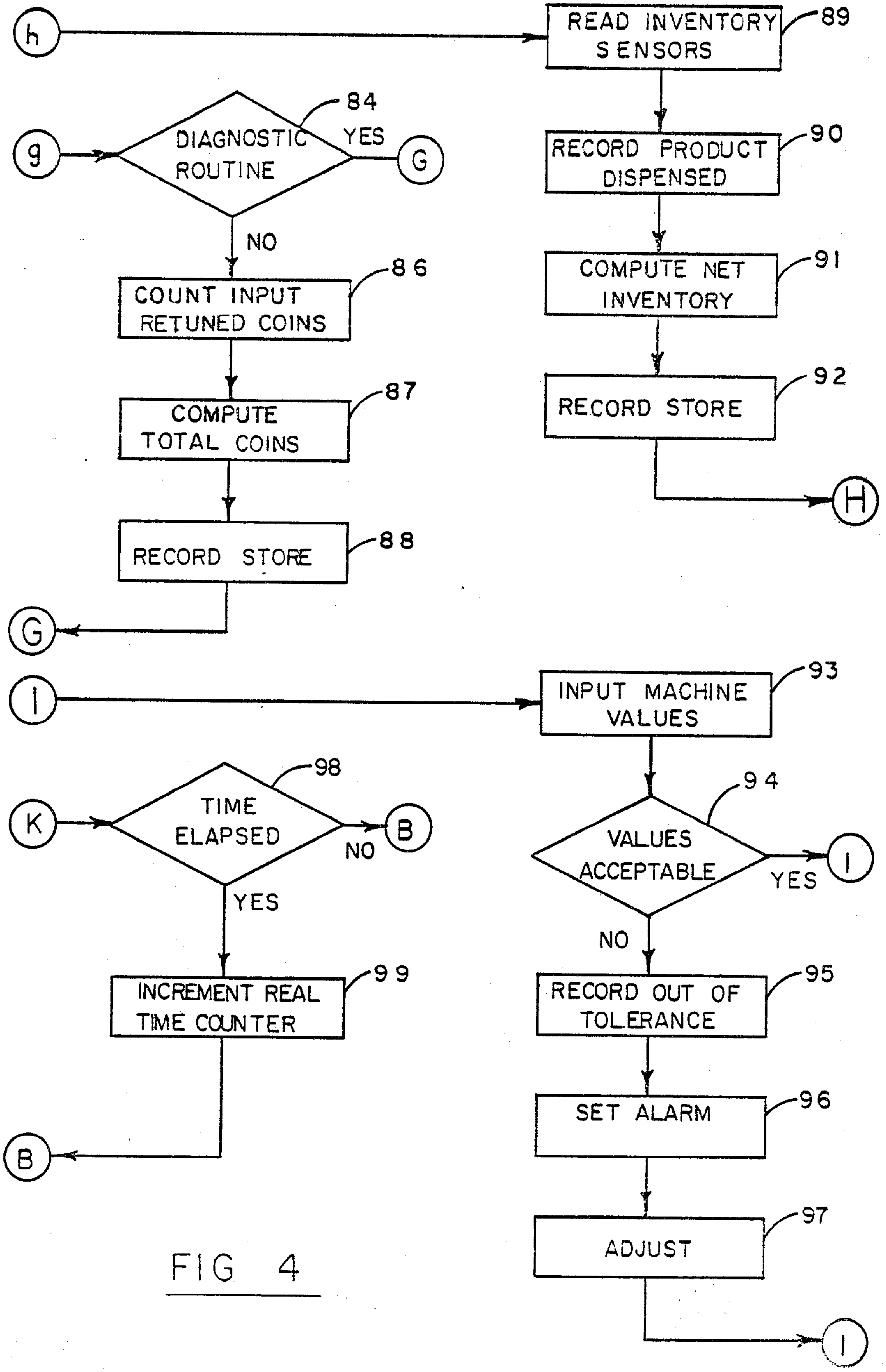
Figure 5:
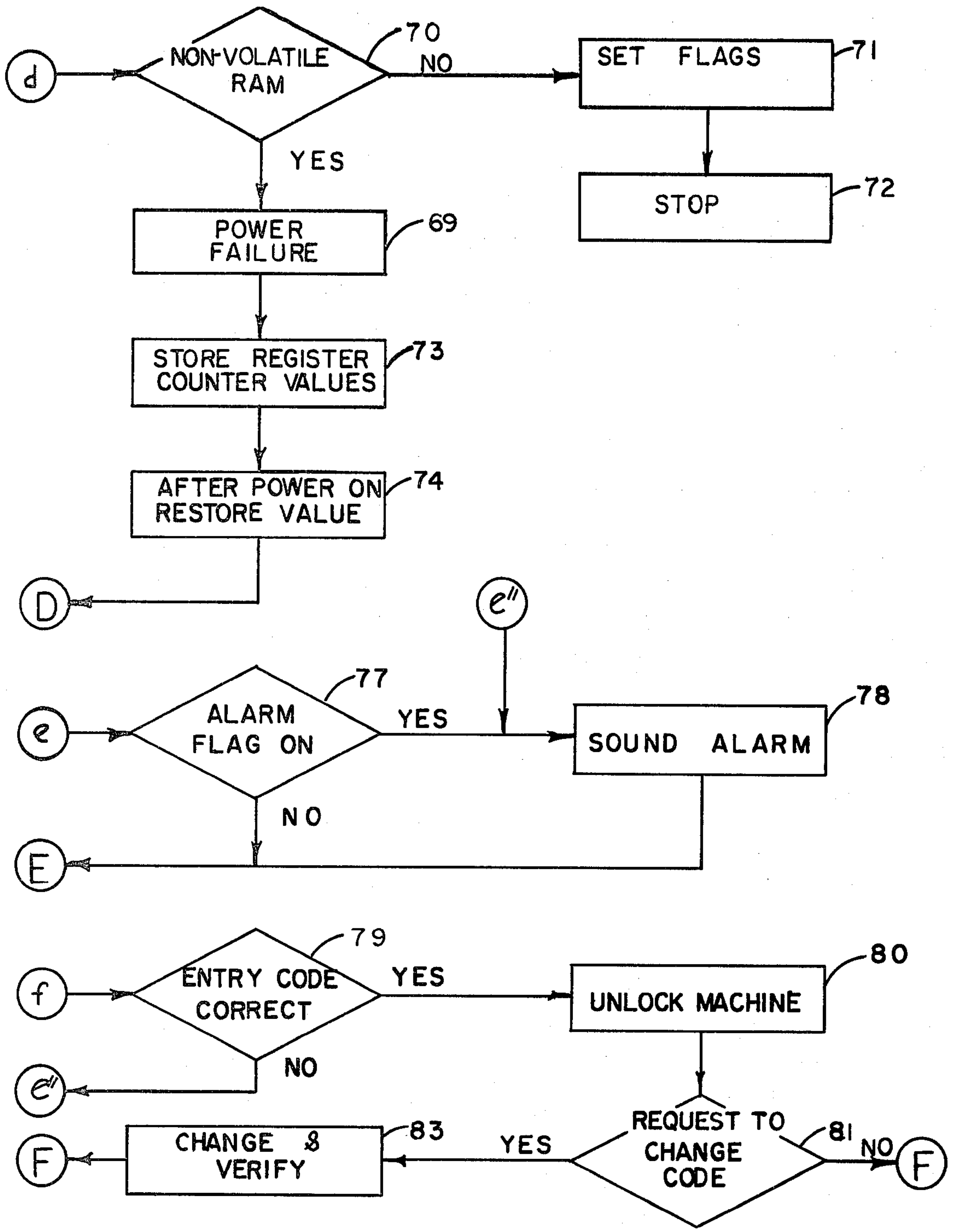
Figure 6:
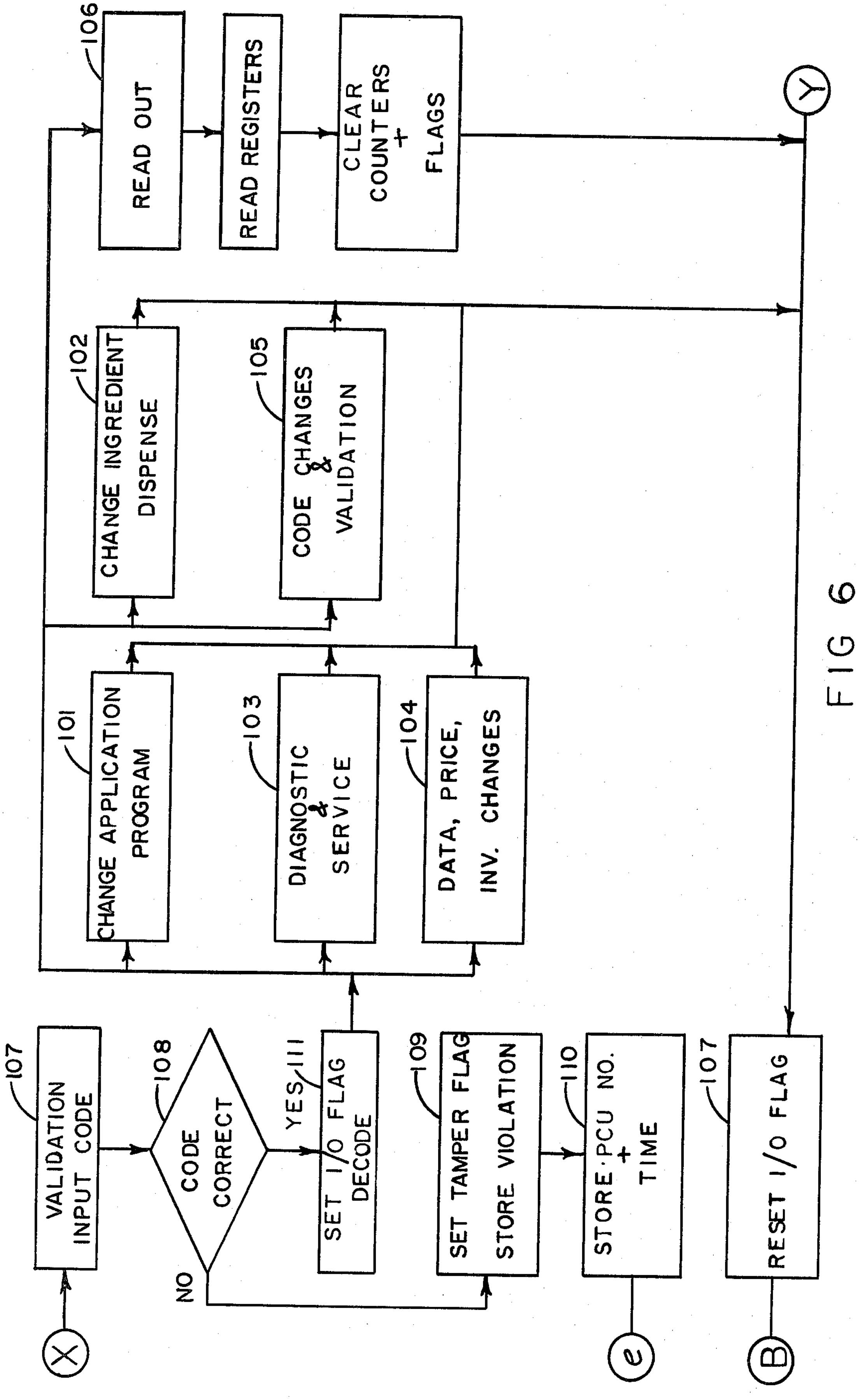

FIGS. 3 to 6 illustrate various programs for operating the system. In FIG. 3, assuming the battery 61 has been connected and the system is on, the counters will be started 62 and the system is initialized 63. An application program is then loaded 64 from the PCU keyboard 29 into the 8048 microprocessor chip 25. If a program is already in the 8048, a PCU interrogation may commence (e.g. a code validation). However, if no program exists in the 8048, the PCU will enter into an idle loop 65 until a program is entered, after which the main program flow is continued.

The registers and flags are then cleared 66 and an operation run request 67 is made. The program again will enter into an idle loop until the run request is made and then proceed down the main path. An input-output request decision 68 is made to determine if an interruption has been made by the PCU 29. The program loop includes a power failure, security violation, electronic lock, net coin input, net inventory input, machine status (e.g. temperature, pressure, mechanical malfunction, etc.), and a real time clock. If no request is present, the program will loop back to the request decision 68 and then continues to loop until a request is received.

Branch routines for various vending machine modes are shown as follows:

POWER FAILURE

When a power failure occurs, and for a volatile RAM 70, a flag is set 71 for the PCU input and the system is stopped 72. When the system is restarted, the flag that was set at 71 will cause the program to jump to A in the main program. If instead a non-volatile RAM is employed 70, the power failure is sensed 69. On restoration of power 74, the register and counter values stored in 73 are then recorded and the program re-enters the main loop at D.

SECURITY VIOLATION

If a security violation occurs, a check is made to determine if a flag is set 77 and the alarm will sound 78. If no alarm sounds, e.g. it has been deliberately blocked, the program will idle between the main loop at E. In either event 77, 78 if a security violation occurs, an alarm will be set off e'' and the program returns to the main program.

ELECTRONIC LOCK

If the electronic lock is to be opened, the entry code is compared with the correct code 79; an incorrect code input could mean an attempt at a security breach is being made. Thus the program jumps to e'' discussed under security violation. If the code is correct, the machine is unlocked 80; if no code change is requested 81, the program jumps to F and then to the main program.

If a code change is requested 83, this is made by loading the register with a new code followed by a code check to confirm that the code is operable. If the code does not perform its function, it is changed, or the lock is replaced, etc. The program then jumps to F in the main program.

COIN PROGRAM

If a diagnostic routine 84 is employed, this would involve a servicing operation such as by-passing the microprocessor 25, dropping cups, dispensing liquids, solids, playing games, etc. If no diagnostic routine is utilized, the coin values of input and output are registered 86 and net coin input is calculated by subtracting coin output from coin input 87. The results are recorded and stored 88 and the program jumps to G in the main program.

INVENTORY CONTROL

This is calculated similarly to the coin output, viz. monitoring the inventory sensors 89, recording inventory product dispensed 90 and calculating, by subtraction, net inventory 91 based on inventory originally supplied. In some cases, where the product can be seen physically, the net inventory should correspond with that actually present (e.g. candy bars). The specific item is then recorded and stored 92 and the program jumps to H.

MACHINE STATUS

Machine values such as temperature, pressure, liquid volumes, etc. are read 93, and compared with a range limit of acceptable values 94. If the values are acceptable, the program jumps to I in the main program. Otherwise, the out-of-tolerance is recorded 95, an alarm (audio, light) is sounded 96, and an appropriate adjustment 97 or other action is taken; the program then jumps to I.

REAL TIME CLOCK

The clock usually may be set to increment after a short elapsed period, e.g. every 1–10 minutes and to record if a transaction has taken place. Hence, if the elapsed period 98 is insufficient, the program will jump to the main program, otherwise the real time clock will be incremented 99 and then return to the main program.

If after a reiteration loop, no status change occurs in any of the various vending machine modes, the program will continue to loop; if an I/O request 68 is received, a specific operation program will take place.

When a specific command has been decoded, it is run as one of the following operations: a change application program 101, a change of dispensing ingredients 102, a diagnostic and service routine 103, a code change and validation 105, a read in of changes in data, prices, inventory, etc. 104, and a read out 106.

As shown in detail, a decode command involves a code check 107, say by subtraction; however, if the code is invalid, it may imply an attempted security breach. Hence, a tamper flag is set and the PCU number is obtained 109. The time of occurrence and PCU number are then recorded 110, and an alarm is sounded. If the code check is valid 108, the I/O is set and maintained active, and then sent to a command decode register for routing into one of the various operation programs 101–106. After completion of a program, a jump (to Y) is made to reset the I/O 107. The read program 106 to Y shows details of the normal read out routine and is self explanatory.

It will be appreciated that many variations of the basic concepts of this invention may be employed without departing from the spirit thereof. Thus, for example, the basic function of this present system can be applied to a coin changer, per se, even though it has no connection with a dispensing vending machine. Also, the present system may be employed in an inventory control system per se totally divorced from a coin input function.

We claim:

1. An apparatus for sensing and totalling transactions in a vending machine, coin changer, and the like, comprising:

A. means for sensing coin input and output transactions;

B. means for converting the sensed transactions into digit signal pulses; and,

C. a plurality of microelectronic circuit registers to receive the digit pulses, including:

i. internal totalling registers for counting net coin intake;

ii. memory registers for storing the net coin intake; and, iii. a read-out register for outputting:

a. the net coin intake from the memory registers, servicing requirements, prior service history, power outages, battery deterioration, tamper attempts and usage times;

b. times and dates of: coin collecting, coin usage, power interruptions, tampering and servicing; and, c. inventory control data, product and price change data, dispensing instructions, machine diagnostics, temperature control adjustments, service time checks, code controlled access entry to security locks, and security alarms;

the read-out registers being adapted for accessing and interrogation by a detachable, portable collection unit for data contained in the memory registers;

the collection unit being adapted for performing calculations and for the input of instruction, data, access codes, code validations code changes, programs and program changes, and for servicing a plurality of vending machines, by means of a keyboard input.

2. A system for monitoring, testing, auditing and controlling a vending machine, coin changer and the like, comprising:

1. A counter-monitor-controller, including:

A. means for sensing input and output transactions;

B. means for converting the sensed transactions into signal pulses;

C. a plurality of microelectronic circuit registers to receive the signal pulses, including:

i. internal totalling registers for counting and monitoring transactions;

ii. memory registers for storing the transactions; and, iii. output registers for outputting the transactions; and, 2. A portable collection unit for receiving transaction information from the memory registers, the collection unit being adapted to serve a plurality of vending machines, and including:

A. transaction processing circuitry; and,

B. input and output means;

the portable collection unit being adapted for access and interrogation of the counter-monitor-controller for data contained in the memory registers, and to store the transaction information in a plurality of memory registers for subsequent release.

3. The apparatus of claim 2, including:

i. memory registers in the counter-monitor-controller adapted to store vending machine numbers and corresponding validation codes; and, ii. output registers for outputting the transactions from the memory registers upon receipt of a valid input code;

the portable collection unit including a register for validating a stored code in the memory register and being adapted to receive information from the memory registers only upon the input of a valid code.

4. The system of claim 2, in which the input of the portable collection unit is a keyboard.

5. The system of claim 2, including I/O interface and control registers for inputting instructions, data, codes and programs from the portable collection unit to the counter-monitor-controller; and, a machine interface adapted to input and output signals between the vending machine and the counter-monitor-controller.

6. The system of claim 5, in which the portable collection unit includes a microprocessor.

7. The system of claim 6, in which the portable collection unit includes a display.

8. The system of claim 6, in which the portable collection unit is adapted to receive a program downloaded from an external source.

9. The system of claim 6, in which the portable collection unit is adapted to receive or transmit from the counter-monitor-controller: data, instructions, codes and code changes and program and program changes.

10. The system of claims 8 or 9, in which the portable collection unit is adapted to download a program into or receive from the counter-monitor-controller including: data, instructions, codes and code changes and program and program changes.

11. The portable collection unit of claim 2, that is optically coupled to the counter-monitor-controller.

12. The portable collection unit of claim 11, in which a bar code is read into the counter-monitor-controller.

13. The system of claim 2, adapted to provide cup dispense, liquid and solid dispense, item dispense, ingredient measure and mixture dispense.

14. The system of claim 2, including a code controlled lock for the vending machine, providing service and coin access.

15. The apparatus of claim 2, in which the monitoring, testing, auditing and controlling is carried out by a counter-monitor-controller that includes a microprocessor having a stored program for controlling and servicing the vending machine.

16. An apparatus for monitoring, testing, auditing and controlling a vending machine, and the like, comprising:

A. means for sensing data transactions;

B. means for converting the sensed transactions into digit pulses;

C. a plurality of microelectronic circuit memory registers to receive and store the digit pulses from the sensed transactions, including:

i. service requirements, prior service history, power outages, battery deterioration, tamper attempts and usage times;

ii. times and dates of power interruptions and servicing;

iii. inventory control data, product and price change data, dispensing instructions, machine diagnostics, temperature, pressure and liquid volume control adjustments, service time checks, code controlled access entry to security locks and security alarms;

D. readout registers adapted for outputting data contained in the memory registers; and, E. a detachable, portable, microprocessor collection unit for accessing and interrogation of the readout registers, the collection unit being adapted to perform calculations and for the input of instruction, data, access codes, code validations, code changes, programs and program changes, and for servicing a plurality of vending machines, by means of an input.

17. The apparatus of claim 16, in which the portable collection unit is adapted to store a program for controlling and servicing the vending machine.

18. The apparatus of claim 17, in which the stored program is adapted to be modified by the portable collection unit by means of a keyboard input.

19. The apparatus of claim 16, in which the monitoring, testing, auditing and controlling is carried out by a counter-monitor-controller that includes a microprocessor having a stored program for controlling and servicing the vending machine.

20. The apparatus of claim 16, in which the input of the portable, microprocessor collection unit is a keyboard.

21. The apparatus of claim 16, comprising:

A. means for sensing coin input and output transactions;

B. means for converting the sensed transactions into digit pulses;

C. a plurality of microelectronic circuit registers to receive the digit pulses, including:

i. internal totalling registers for counting net coin intake;

ii. memory registers for storing the net coin code count; and, iii. output registers for outputting the net coin count from the memory registers.

* * * * *